United States Patent Office 3,285,734
Patented Nov. 15, 1966

1

3,285,734
METHOD OF PRODUCING HOMOGENEOUS
METAL-CONTAINING SOLID MIXTURES
Arthur Adler, % C. K. Williams & Co., Inc.,
Easton, Pa.
No Drawing. Filed Oct. 1, 1963, Ser. No. 312,881
18 Claims. (Cl. 75—.5)

This invention relates to a process for producing homogeneous solid mixtures and, in particular, to the production of metal-bearing compositions, such as metals or alloys, metals mixed with inorganic materials to form semimetallics, cermets and the like, and uniform mixtures of normally immiscible metals.

Generally, in the production of metal-bearing compositions, ingredients in the form of powders are mixed by dry or wet methods and thereafter the mix, in the dry state, is subjected to a heating cycle in a reducing atmosphere to produce a metal-bearing composition, whether completely metal or a mixture of metals and non-metals. The foregoing method has the disadvantage that the final product is not always as uniform as desired. This is particularly true in the case of the iron-copper metal product produced by the reduction of an intimate mixture of iron oxide and copper oxide. No matter how uniformly these oxides are mixed together, the copper tends to segregate when the mixture is reduced at elevated temperature. This appears to be due to the fact that the copper oxide tends to reduce at a substantially lower temperature than, and independent of, the iron oxide present. Apparently, as the reduced particles of copper form, they agglomerate, whereby copper-rich areas form as aggregates. This is quite noticeable after the completion of the reduction: blotches of copper can be distinguished from the grey metallic luster of the reduced iron.

Similar results occur when attempts are made to produce intimate mixtures of metals and non-metals, or intimate mixtures of metals which under normal circumstances form immiscible systems.

I find that, with my present invention, I can overcome the foregoing disadvantages. Stating it broadly, my invention comprises providing ingredients which include particles of at least two metal-bearing substances, at least one of which is a reducible substance, i.e. a metal associated with oxygen capable of being reduced to metal in a reducing atmosphere, for example hydrogen, said associated metal being one having a melting point above 250° C., and preferably one whose oxide negative free energy of formation ranges up to about 70,000 calories per gram atom of oxygen at 25° C. The invention additionally comprises providing a polyhydroxy organic substance which is decomposable at an elevated temperature to form volatile end products and carbon; providing a liquid vehicle or solvent for said organic substance in an amount sufficient, when mixed with all of the ingredients present, to form a viscous liquid mass or paste; subjecting said liquid mass to intimate or turbulent mixing; drying to a homogeneous residue; heating said residue in a reducing atmosphere at an elevated temperature sufficient to decompose said organic substance, and continuing said heating to reduce the reducible inorganic metal-containing substance.

The metal-bearing substances may be in the form of oxygen-bearing compounds of metals. These compounds may be oxides or complex oxidic compounds, or hydroxides, or in some cases may be metal powders with some oxide on their surfaces. Such compounds may also be in the form of plumbates, silicates, titanates or other similar oxygen-bearing compounds, metallic acid salts, anhydrides, or minerals.

The metal-bearing compounds may comprise two groups; one of which is reducible to metal by heating at an elevated temperature in a reducing atmosphere, the other group of which is substantially inert for the purposes of this invention.

As stated, the reducible compounds are those whose metals in the reduced state have melting points above 250° C. and, preferably, those whose oxides have a negative free energy of formation ranging up to about 70,000 calories per gram atom of oxygen at about 25° C. Examples of such compounds are copper oxide, nickel oxide, litharge, copper carbonate, iron oxide, cobalt oxide, tungsten oxide (e.g. tungstic acid), silver tungstate, and any other metal oxide compounds whose negative free energy of formation per gram atom of oxygen preferably does not exceed 70,000 calories.

Also present in the formulation may be a compound of a metal which is characterized by an oxide negative energy of formation of at least about 90,000 calories per gram atom of oxygen at 25° C. In one embodiment, this substance may decompose under the conditions of the process to form a refractory oxide. Alternatively, it may be substantially inert under the process conditions, preferably melting above about 500° C., as further discussed and exemplified hereinafter.

A preferred type of inert metal compound includes those oxides melting above about 1250° C. and whose negative free energy of formation is at least about 90,000 calories per gram atom of oxygen at about 25° C. Examples of such materials include an asbestos type magnesium silicate material known by the trademark Asbestine, certain of the aluminum silicate micas such as muscovite, biotite and the like, phlogopite mica, diatomaceous silica, $CaCO_3$, $MgO$, $ThO_2$, $Al_2O_3$, and other substantially inert materials. Examples of other appropriate substantially inert materials include refractory carbides, such as tungsten carbide, chromium carbide, molybdenum carbide, titanium carbide, zirconium carbide, and the like.

For certain desired finished products it may sometimes be desirable to include such compounds as $NaOH$, $Na_2CO_3$ and the like. Their use results in the formation of ultra fine particles ranging from 1 to 10 microns in average size in the finished powders. As these compounds are soluble in water, they can be washed out of the finished powder, without substantially affecting the resulting composition.

The particulate metal-bearing substances are mixed while in contact with a dispersion of a polyhydroxy organic compound, such as a carbohydrate, for example, sugars, starch, cellulose, dextrins, the glucose polymer known as dextran, and the like. The sugars include glucose, fructose, xylose, sucrose and lactose. Other polyhydroxy organic compounds may also be employed, e.g. compounds of carbon, hydrogen and oxygen including sorbitol, methyl cellulose, gums such as locust bean gum and Jaguar gum, pentaerythritol, glycerol, and diols such as ethylene glycol, propylene glycol, butylene glycol, butene diol, dimethyl hexanediol, neopentyl glycol, glyceryl monoacetate and other monoglycerides, glyceryl monomethyl ether and other glyceryl monoalkyl ethers, diethylene glycol, triethylene glycol, polyethylene glycol and the ethylene oxide polymers known as the Carbowaxes. The vehicle forming the dispersion or solution may be water, or such organic solvents as alcohols, ketones and similar solvents.

The solvent when uniformly mixed with all of the ingredients should preferably yield a paste having a relatively high viscosity compared to water at about 70° F. I find this to be useful in intimately mixing and treating the ingredients by ball milling or in a colloid or similar mill. I measure the paste viscosity by using a cylindrically shaped, polished stainless steel flow cup device which has a downwardly tapered conical bottom or inverted cone truncated at its end, the truncated portion defining an orifice. The cylindrical portion of the cup is 2" long and 2" in diameter. The base of the inverted cone forming the bottom of the cup has the same diameter as the cylinder and extends seven-eighths of an inch from the bottom of the cylinder to the orifice forming the truncated end which is five thirty-seconds of an inch in diameter. The cup is designed to hold a standard volume of 125 cubic centimeters of the liquid mix to be tested. The flow tests are run at about 70° F. Under these conditions, 125 cubic centimeters of water takes about 15 seconds to pass by gravity through the orifice. For my purposes, I have found that a desirable viscosity or flow characteristic at about 70° F. is that corresponding to a flow time of at least about 330 and preferably between about 860 and 1190 seconds. If the viscosity or flow characteristic is substantially above these ranges, I find I get a very sluggish mix which is not readily amenable to treatment. It will be appreciated that one may start with a lower viscosity and then bring it up above the minimum by reduction grinding, and the milling may thereafter be continued at the higher level of viscosity. It is preferred that the particles of the material be below 100 mesh in size.

It is believed the solids of the batch after a suitable time of mixing have complexes associated with their surfaces as a result of the controlled milling in the specially prepared liquid medium. By maintaining the mix in a pasty, viscous state, the foregoing type of surface conditioning seems to be favored. However, I do not wish to be bound by any specific theory or hypothesis.

It is possible to mix these metal-bearing pastes by many procedures to effect turbulent mixing, such as by stirring, or tumbling, but one of the most satisfactory procedures is by means of a ball mill or high speed colloid mill.

After the batch has been suitably mixed it is dried by the evaporation of the solvent medium, the temperature for drying depending on the particular vehicle or solvent employed. If for example, the solvent is water, the batch can suitably be dried at temperatures above 100° C.

The dried batch usually consists of granules of varied sizes up to about one inch in diameter, which may appear crystalline due to the presence of the polyhydroxy compound. To insure uniform reduction, the granules may be dry-ground, suitably in a one-stage hammer mill or micro-type pulverizer, until the particles are small enough to pass through at least a 30 mesh screen (U.S. Standard).

The thus dry-ground batch can then be reduced in any standard type reduction furnace in the presence of a suitable reducing gas such as hydrogen, cracked ammonia, or hydrocarbon gas, etc. The reduction temperature depends mainly on the particular composition being processed, and will usually fall in the range of from about 300° C. to 1100° C. for reaction periods ranging from about 15 minutes to about 60 minutes and higher. Although the organic polyhydroxy compound decomposes at the reduction temperatures, the carbon content of the final product is not appreciable, normally being below 500 parts per million and frequently substantially lower. The reduction results in a somewhat sintered sponge which may readily be ground to the desired particle size.

The new process has a dramatic effect on the friability of the metal product, yielding an easily ground metal cake from the reduction furnace at temperatures which would normally give a hard mass of metal. Friability in general increases with the level of organic polyhydroxy compound. Thus, by varying the level, the physical properties of the final metallic powder can be varied considerably. In other words, the level of organic substance can be used to tailor the physical properties of the powder produced to close specifications.

The powders produced by the new process, after compacting and sintering, exhibit superior physical properties, including hardness and tensile strength, as compared with the products of simple metal powder mixtures.

Still another important advantage of the novel method of the present invention is that the reduction temperature for the mixture is different from that of the metal oxides alone. Thus, the high temperature hitherto used in reducing iron compounds is not needed where the iron compound is admixed with a compound of another metal which reduces at a relatively lower temperature. It is found that iron oxides which are reducible at 1000° C. alone, tend to reduce in the presence of active reducing gases at 850° C. when mixed with a copper oxide in the present procedure, and the reduction of the mixture is more rapid than the reduction of the unmixed iron compound at 1000° C.

As illustrative of the invention, examples are given showing the use of reducible and non-reducible metal compounds, oxidized metal powders, acid anion and metal cations, and polyhydroxy organic compounds such as sucrose, glucose, starch and the like, in the production of mixed compositions.

EXAMPLE 1

A series of materials can be prepared utilizing my invention which I call "semi-metallic powders and pigments." These are essentially metals or alloys in integral relation with inert substances such as minerals, ceramics, refractory silicates and other similar inorganic oxygen-bearing refractories whose negative free energy of the oxide is preferably at least about 90,000 calories per gram atom of oxygen at 25° C. These can be employed primarily as inexpensive feed materials for the production of semi-metallic pigments as used in paints and protective coatings. They can also be employed as drying or curing agents in various types of organic vehicles or liquids, such as plastisols, to reduce the curing time by virtue of the improved heat conductivity of the metallic portions. Other applications include use as catalysts for organic systems, as in the production of linear polyethylene and the like. In this example, I prefer to produce metals in integral relation with or supported on a silicate core material, with the object of providing the cheapest possible product from natural or near natural ground minerals and ores. Such materials include wet or dry ground mica, magnesium silicate particles (asbestos), diatomaceous earth and silica, calcium silicate and the like. Compositions can be created containing varied percentages of metal to non-metal ratios. That is compositions can contain 90% metal, 10% non-metal (90/10), or as 10/90 or 50/50 or 75/25 or 38/62 or 8/92. Stating it broadly, the uniform mixture may contain 1 to 99% metal with substantially the balance 99 to 1% non-metal by weight.

During mixing, samples may be removed from the mill and the viscosity or flow characteristic checked through the flow cup device at about 70° F. If the viscosity is not quite as high as desired, the mixing may be continued, since the viscosity increases with mixing time. Where the viscosity remains outside the preferred working range, adjustments may be made to the mill charge.

The following examples also show the use of other substantially inert oxygen bearing compounds, such as carbonates and sulfates.

EXAMPLE 1A.—SEMI-METALLIC COPPER POWDERS

Three composition ratios are given. The following denotes the pounds of each compound required to produce 100 pounds of finished powder for the ratios of metal to non-metal shown:

| Compounds | Ratios | | |
|---|---|---|---|
| | 90/10 | 50/50 | 10/90 |
| Cupric Oxide (CuO) | 109.5 | 56.3 | 11.3 |
| Cupric Nitrate (Cu(NO$_3$)$_2$·3H$_2$O) | 9.5 | 19.0 | 3.8 |
| Asbestine [1] 3x (MgSiO$_3$) | 10.0 | 50.0 | 90.0 |
| Sucrose | 10.0 | 10.0 | 10.0 |
| Water | 35.0 | 50.0 | 60.0 |
| Flow Characteristic, Sec | 1,043 | 1,021 | 862 |

[1] Trademark for magnesium silicate asbestos.

Each individual batch is ball milled for approximately 60 minutes, dried, and ground through a 30 mesh screen. The three ratios (as well as other ratios of copper to non-metal) are reduced in the presence of hydrogen at a temperature of 850° C. for 15 minutes, then re-ground to the desired particle size.

EXAMPLE 1B.—SEMI-METALLIC COPPER ALLOY POWDER

The following semi-metallic powders illustrate materials for the same application as those in Example 1A except that the metal is an alloy such as brass or bronze. The ratios shown are metal to non-metal.

| Compounds | Ratios | | |
|---|---|---|---|
| | 76/24 | 50/50 | 41/59 |
| Cupric Oxide (CuO) | 79.3 | 50.0 | 39.9 |
| Cupric Nitrate (Cu(NO$_3$)$_2$·3H$_2$O) | 19.0 | 19.0 | 19.0 |
| Tin Powder (−325 mesh) | 7.6 | 5.0 | 4.1 |
| Wet Ground Mica (Al(SiO$_3$)$_3$) | 24.0 | 50.0 | 59.0 |
| Glucose | 20.0 | 20.0 | 20.0 |
| Water | 65.0 | 90.0 | 115.0 |
| Flow Characteristic, Secs | 1,062 | 992 | 940 |

The foregoing compositions produce 100 pounds of bronze product whose metallic portion is equivalent to 90% copper and 10% tin, supported on mica. The tin powder illustrates the use of metal powders. The powder is processed and reduced under the same conditions as in Example 1A.

EXAMPLE 1C.—SEMI-METALLIC POWDERS

This example illustrates the use of metals other than copper and tin. Nickel and lead are chosen to show the differences in reduction temperature. While only one ratio is illustrated for each to produce 100 pounds of product, other ratios are also suitable.

Nickel semi-metallic (50/50 ratio):
  Nickel oxide (NiO) _____ 57.2
  Nickel nitrate (Ni(NO$_3$)$_2$·6H$_2$O) _____ 24.8
  Diatomaceous silica (CaSiO$_3$) _____ 50.0
  Fructose _____ 20.0
  Ethyl alcohol _____ 50.0
  Flow characteristic _____secs__ 992
Lead semi-metallic (50/50 ratio):
  Litharge (PbO) _____ 51.6
  Lead acetate (Pb(Ac)$_2$·3H$_2$O) _____ 3.7
  Asbestine 3x (MgSiO$_3$) _____ 50.0
  Starch _____ 10.0
  Water _____ 50.0
  Flow characteristic _____secs__ 986

The batches are processed in the same manner as Example 1A. However, the lead semi-metallic powder is produced by reduction at 625° C. for 15 minutes, and the nickel semi-metallic powder is produced by reduction at 1050° C. for 20 minutes. Iron would be processed similar to nickel. This example shows the substitution of a diatomaceous earth for mica or asbestos, starch and fructose for sucrose, acetate for nitrate, and alcohol for water.

EXAMPLE 1D.—LEAD SEMI-METALLIC POWDER ON NON-SILICATE SUPPORTS

This example illustrates the substitution of carbonates and sulfates for silicates. An illustration is also given showing the sue of a non-oxygen bearing inorganic support such as a halogen salt. This type of compound can be employed providing it is not reducible to the metal at the temperature and under the conditions being used to reduce the batch to a semi-metallic powder. A 50/50 ratio is used in all of the examples. The reducing atmosphere is hydrogen.

| Compounds | Carbonates | Sulfates | Halogens |
|---|---|---|---|
| Litharge (PbO) | 51.6 | 51.6 | 51.5. |
| Lead Acetate (Pb(Ac)$_2$3H$_2$O) | 3.7 | 3.7 | 3.7. |
| (or nitrate-Pb(NO$_3$)$_2$) | (3.2) | (3.2) | (3.2). |
| Inert non-metallic: | | | |
| Either CaCO$_3$ | 50.0 | PbSO$_4$, 50.0 | PbCl$_2$, 50.0. |
| Or Na$_2$CO$_3$ | 50.0 | BaSO$_4$, 50.0 | BaCl$_2$, 50.0. |
| Or PbCrO$_4$ | 50.0 | Na$_2$SO$_4$, 50.0 | AlF$_3$, 50.0. |
| Sucrose | 5.0 | 5.0 | 5.0. |
| Water | 40.0 | 40.0 | 40.0. |
| Reduction Temp | 600° C | 600° C | 475° C. |
| Reduction Time | 15 min | 15 min | 15 min. |

The measured flow characteristics of the batches containing CaCO$_3$, PbSO$_4$ and PbCl$_2$ are 810, 721 and 894 seconds, respectively. The batches containing the other inert ingredients fall within the range of 330 to 1230 seconds.

An example is given here to demonstrate the conversion of a compound to the non-metallic support, starting as a soluble compound in the liquid phase. Using the example of lead and changing the ratio to 98 metal/2 non-metal, the following batch is prepared for 180.5 lbs. of finished powder. The support is sodium plumbite to produce a lead-rich semi-metallic of Pb/Na$_2$PbO$_3$:

Litharage (PbO) _____ 192.0
Lead acetate (Pb(Ac)$_2$3H$_2$O) _____ 1.8
Sodium hydroxide (NaOH) _____ 0.8
Sucrose _____ 3.0
Water _____ 30.0
Flow characteristic _____secs__ 1185

The batch is processed as in Example 1A and reduced in hydrogen gas at 625° C. for 15 minutes. The final product contains 177 lbs. of lead to 3.5 lbs. of sodium plumbite, the particles all being smaller than 5 microns.

EXAMPLE 2

A second series of materials which may be prepared are those commonly termed "cermets," as distinguished from the semi-metallics of Example 1. This distinction is made on the basis of the decomposition of the non-reducible copound to an inert non-metallic dispersed hard phase. In Example 1, the non-metal portions are as added to the original formulation, without substantial change during the processing, the one exception being the production of sodium plumbite.

In the following examples, properties are enhanced by inclusion of dispersed hard phases of a ceramic character. Alloys which may be improved include brasses, bronzes, nickel-base heat resistant alloys, e.g. the alloy known by the trademark Inconel, stainless steels, Co-Cr-W alloys, or other super alloys.

EXAMPLE 2A.—NICKEL-SILVER-BRASS-MgO DISPERSION

Many of the conventional brasses, bronzes, and other cupro alloys are appropriate. This example shows a hard phase of magnesium oxide dispersed into one such alloy having the following composition as a leaded nickel silver:

|  | Percent |
|---|---|
| Copper | 66.0 |
| Nickel | 25.0 |
| Tin | 5.0 |
| Zinc | 2.0 |
| Lead | 1.5 |

To this composition approximately 1% by weight of magnesium oxide is added as a dispersed phase through the decomposition of magnesium acetate. A batch to produce 100 lbs. of the finished product is prepared from the following materials:

| | |
|---|---|
| Cupric oxide (CuO) | 70.0 |
| Cupric carbonate ($CuCO_3Cu(OH)_2$) (53 to 55% Cu assay) | 19.1 |
| Nickel oxide (NiO) | 31.8 |
| Tin powder (—325 mesh) | 5.0 |
| Zinc nitrate ($Zn(NO_3)_2 6H_2O$) | 9.1 |
| Lead formate ($Pb(CHO_2)_2$) | 2.2 |
| Magnesium acetate ($Mg(Ac)_2$) | 3.5 |
| Sucrose | 9.0 |
| Water | 35.0 |
| Flow characteristic _____secs__ | 949 |

It will be noted that other oxygen compounds may be used as soluble or insoluble salts, such as the carbonates, formates, acetates and nitrates. The batch is mixed as in Example 1 and the reduction is carried out at 1050° C. for 25 minutes in free-flowing hydrogen gas. Normally, the sublimation of the zinc particles would be expected under these conditions, resulting in the loss of zinc in the finished product. However, this did not occur, as evidenced by the analysis of the final product, as follows:

|  | Percent |
|---|---|
| Copper | 65.84 |
| Nickel | 24.85 |
| Tin | 4.95 |
| Zinc | 1.98 |
| Lead | 1.48 |
| Magnesium oxide | .90 |

The ratio of metal to oxide is about 99/1, while the ratio of zinc to the balance metal is 1.98/97.12 or 2% of the metallic portion as desired. As the magnesium compound is not reducible at 1050° C. to the metal, the oxide forms as an internal dispersed phase throughout the material.

EXAMPLE 2B—STAINLESS STEEL-$ThO_2$ DISPERSION

Stainless steel cermets can be prepared with dispersions of alumina, thoria, magnesia and the like. This example illustrates the incorporation of a rare earth oxide such as thorium oxide into the structure of a standard 18–8 stainless steel, or similar stainless iron alloy.

A master ferro alloy is employed which has been pre-ground to —200 mesh powder and reduced in hydrogen at 1000° C. for 20 minutes. This effectively decarburizes the alloy of its otherwise high carbon content. The treated powder is re-ground through 200 mesh, whereby some surface oxidation occurs. The composition is found by analysis to comprise 65.0% Cr, 28.4% Fe, 4.7% Si and a carbon content of 1.9%.

In order to produce 100 lbs. of the stainless cermet the following formulation is prepared:

| | |
|---|---|
| Iron oxide ($Fe_2O_3$) | 88.7 |
| Ferro chrome (—200 mesh) | 27.7 |
| Nickel oxide (NiO) | 10.2 |
| Thorium nitrate ($Th(NO_3)_4 4H_2O$) | 6.3 |
| Manganese sulfate ($MnSO_4$) | 2.7 |
| Sucrose | 10.0 |
| Water | 50.0 |
| Flow characteristic _____secs__ | 997 |

The batch is processed as described in Example 1 and thereafter reduced in hydrogen at 1050° C. for 45 minutes. Analysis of the product shows the following composition:

| | |
|---|---|
| Iron | 69.05 |
| Chromium | 17.76 |
| Nickel | 7.94 |
| Silicon | 1.24 |
| Manganese | .97 |
| Carbon | .10 |
| Thorium oxide | 2.94 |

EXAMPLE 2C.—NICHROME-$Al_2O_3$ DISPERSION

High temperature nickel and molybdenum alloys, such as those known in the trade as Nichrome, Inconel, Hasteloy, and the like, can also be produced having ceramic oxides dispersed in the matrix. The Nichrome (80 Ni-20 Cr) cermet example will show the use of an alloy powder comprising 50% Ni-50% Cr as a master alloy ingredient in producing 100 lbs. of the product as follows:

| | |
|---|---|
| Nickel oxide (NiO) | 75.0 |
| 50–50 Ni–Cr (—325 mesh) | 40.0 |
| Nickel sulfate ($NiSO_4 6H_2O$) | 4.5 |
| Aluminum acetate ($Al(Ac)_3$) | 20.0 |
| Sucrose | 10.0 |
| Water | 30.0 |
| Flow characteristic _____secs__ | 1018 |

The batch is processed as in the previous examples and reduced at 1050° C. for 60 minutes. The final product has the following analysis:

|  | Percent |
|---|---|
| Nickel | 76.19 |
| Chromium | 18.72 |
| Aluminum oxide | 5.09 |

The oxide is finely dispersed throughout the powder.

EXAMPLE 2D.—STELLITE-$Al_2O_3$ CERMET

It is also possible to produce cermets having more than one non-metallic phase dispersed throughout the metal matrix, such as dual oxides, as for example $Al_2O_3/UO_2$, of varying percentages. This example shows the formulation of a high-temperature cobalt-base alloy with a dispersion of refractory oxide and refractory carbide. While the oxide is produced in situ by the decomposition of a soluble salt, the tungsten carbide is added in the form of a finely divided solid phase. To produce 100 lbs. of product, the following batch is prepared:

| | |
|---|---|
| Cobalt oxide (Co$_2$O$_3$) | 67.4 |
| Cobaltous tungstate (CoWO$_4$) | 8.3 |
| Tungstic acid (H$_2$WO$_4$) | 13.6 |
| Tungsten carbide powder (−325 mesh) | 7.0 |
| Chromium powder (−325 mesh) | 20.0 |
| Silicon powder (−325 mesh) | 1.0 |
| Nickel oxide (NiO) | 12.7 |
| Iron nitrate (Fe(NO$_3$)$_3$9H$_2$O) | 21.7 |
| Manganese nitrate (Mn(NO$_3$)$_2$6H$_2$O) | 7.8 |
| Aluminum nitrate (Al(NO$_3$)$_3$9H$_2$O) | 22.1 |
| Sucrose | 15.0 |
| Water | 45.0 |
| Flow characteristic _____secs | 1006 |

The batch is processed as in Example 1 and reduced at 1100° C. for 60 minutes in hydrogen gas, then reground to particle size. The analysis of the finished lot shows the metallic portion of the product to be equivalent to a material designated as Haynes Alloy No. 25:

| | |
|---|---|
| Cobalt | 45.10 |
| Chromium | 18.09 |
| Tungsten | 13.54 |
| Nickel | 9.09 |
| Iron | 2.33 |
| Manganese | 1.36 |
| Silicon | .91 |
| Aluminum oxide | 2.72 |
| Tungsten carbide | 6.86 |

The metal/non-metal ratio is approximately 90/10. The example demonstrates the use of complex oxides (cobaltous tungstate) of several metals, as well as different compounds of the same metal (tungsten).

The flow characteristics of the batches of Examples 2A–2D range from about 949 to 1018 seconds.

EXAMPLE 3

This example deals with all-metal systems of alloys composed of immiscible or normally non-alloyable metals.

EXAMPLE 3A.—TUNGSTEN ALLOYS

Tungsten metal is not readily alloyable with many of the non-ferrous metals such as copper, silver, cadmium, etc. This example illustrates the production of a tungsten-base alloy containing copper, silver and nickel (the nickel and silver being non-alloyable with each other). It will be readily seen that by the omission of certain compounds, binary or ternary alloys can be formulated such as W/Cu, W/Ag and W/Cu/Ag, as well as others. A batch for producing 100 lbs. of finished powder is as follows:

| | |
|---|---|
| Tungstic oxide (WO$_3$) | 77.2 |
| Silver tungstate (Ag$_2$WO$_3$) | 21.5 |
| Nickel carbonate (NiCO$_3$) | 30.3 |
| Cupric oxalate (CuC$_2$O$_4$·1/2H$_2$O) | 12.6 |
| Nitric acid (Spec. Grav. 1.49) | 10.0 |
| Glucose | 20.0 |
| Water | 50.0 |
| Flow characteristic _____secs | 1121 |

The acid is added in an amount to dissolve first the copper compound and then the nickel compound. The acid is first dissolved in the water. After thoroughly mixing all the other ingredients, the batch is wetted slowly with the acid solution. The mixture is now processed as in Example 1, and after drying is reduced in free-flowing hydrogen gas at 1000° C. for 45 minutes. The final alloy product has the following composition:

| | Percent |
|---|---|
| Tungsten | 69.7 |
| Nickel | 14.8 |
| Silver | 10.8 |
| Copper | 5.3 |

A similar procedure would be employed in producing a molybdenum-base alloy.

EXAMPLE 3B.—CHROMIUM ALLOY

This example illustrates the production of an alloy of copper containing chromium, each of the constituents of the copper alloy being somewhat non-alloyable with chromium. However, by utilizing the invention, an intimate alloy mixture is obtained.

The starting material for the copper alloy is brass scrap. Brass turning scrap is analyzed and found to contain the following elements by weight:

| | |
|---|---|
| Copper | 60.10 |
| Zinc | 37.40 |
| Lead | 1.72 |
| Tin | 0.78 |

Twenty pounds of this scrap is dissolved in a 42° Bé. nitric acid solution. After enough acid is added to completely dissolve the scrap, the solution is filtered to remove all impurities, including oil, etc. The solution is evaporated to a mixed crystalline nitrate and the crystals are then calcined at 425° C. for 35 minutes, which produces a blackish-brown mixed oxide of the brass components with some sintering. The weight of the oxide is found to be about 26.83 lbs., somewhat higher than the calculated weight of the individual metals as oxides. Using this mixed oxide, a batch to produce 100 lbs. of finished chromium alloy powder is prepared containing:

| | |
|---|---|
| Chromium powder (−325 mesh) | 77.0 |
| Mixed copper alloy oxides | 26.8 |
| Cupric nitrate (Cu(NO$_3$)$_2$·3H$_2$O) | 11.4 |
| Sucrose | 9.0 |
| Water | 30.0 |
| Flow characteristic _____secs | 899 |

The method of mixing is as in Example 1. The reduction is carried out in free-flowing hydrogen at 1100° C. for 35 minutes, and the product is then reground and screened to the desired particle size. The analysis is as follows:

| | |
|---|---|
| Chromium | 76.87 |
| Copper | 15.12 |
| Zinc | 7.39 |
| Lead | .46 |
| Tin | .16 |

The chromium is uniformly distributed throughout.

In producing the mixes in the Examples of 1, 2 and 3, the amount of vehicle or solvent employed was generally the minimum required to give a suitable paste while at the same time keeping the drying time (removal of solvent) after mixing to a minimum.

As is apparent from Examples 1, 2 and 3, three types of homogeneous products may be produced in accordance with my invention.

Type 1 are composite powder products suitable for use as semi-metallic powders, or pigments, or as catalysts, and the like. Examination of these powders indicates that the inert particles are integral with or apparently covered by the metal reduced from inorganic metal oxide, or from a reducible inorganic metal oxide and a metal powder, or from a reducible inorganic metal oxide and a metal salt. The metal components of the reducible materials are those having a melting point above 250° C. and preferably an oxide negative free energy of formation ranging up to about 70,000 calories per gram atom of oxygen at about 25° C. Together with the metal oxide, I may add metal powder in forming the mix. The inert particles supporting the reduced metal may be any inorganic substance which will not reduce and which is substantially stable under the reducing and heating conditions of the reaction and which has a melting point above about 500° C., for example, refractory materials or such other materials as CaSO$_4$, BaSO$_4$, PbCl$_2$, etc. Preferably, the inert inorganic substance is a refractory oxide type material, such as asbestos, mica, alumina, diatomaceous earth, silicates, calcia, beryllia, baria, strontia, silica, or similar materials having melting or softening points above about 1250° C. and characterized by an oxide negative free energy of formation of at least about 90,000 calories per gram atom of oxygen at about 25° C. In producing the composite powder as a final product the ingredients may be proportioned to yield a final product in which the reduced metal ranges from about 1% to 99% and the inert substance ranges from about 99% to 1% by weight. Preferably, the final product may have a reduced metal content ranging from about 25% to 75% and an inert particle content of about 75% to 25% by weight. Examples of materials which have been produced by my invention include composite powders comprising either copper, lead, iron, or metal alloys integrally associated with asbestos type material, mica, diatomaceous earth, or similar materials.

In producing semi-metallic composite powders of the foregoing type, I have found that the non-metallic portion may have an absolute density falling within the range of about 2 to 6 grams/cc. and the metal portion from about 6.5 to 21.5 grams/cc. (e.g. such metals as copper, iron, nickel, lead, tungsten, platinum, etc.), such that the absolute density of the composite powder itself will fall within the broad range corresponding to about 15% to 90% of the density of the metal portion, and preferably 25% to 75% of that density.

For a composite powder containing about 10% to 90% by weight of non-metal and substantially the balance a metal integrally associated therewith, wherein the non-metal portion has an absolute density falling within the range of about 2.0 to 4.5 and the metal portion an absolute density of about 7.5 to 11.5 (e.g. such metals as Fe, Ni, Cu, Pb, etc.), the absolute density of the composite powder itself will generally fall within the range corresponding to about 85% to 25% of the absolute density of the metal portion. When the composite powder contains about 25% to 75% non-metal and substantially the balance metal, the absolute density of the powder will generally fall within the range corresponding to 70% to 30% of the absolute density of the metal portion. Composite powders formed from such siliceous non-metallics as asbestos, mica, talc, diatomaceous silica and the like, with such metals as Cu, Fe, Ni, Pb and Cu-base, Fe-base, Ni-base and Pb-base alloys, in amounts ranging from about 40% to 60% by weight of elemental metal, will generally have a density of about 3–5 g/cc.

In Example 1A, in which a composite powder comprising about 50% Cu and 50% finely ground asbestos was produced, the composite powder product has an absolute density of about 4.17 grams/cc., which is about 50% of the density of copper. A micrographic examination of the composite powder shows it to have a flat-like and substantially two-dimensional configuration in which the copper appears to coat the asbestos. This type powder has a high specific surface to particle volume ratio and is excellent as a paint pigment.

Composite powder comprising about 50% Fe and 50% asbestos produced similarly has an absolute density of about 3.89 grams/cc., which is about 49.3% of the density of iron. A micrographic examination shows the composite powder product to be flat-like and to have a two-dimensional configuration, i.e. platelets. This powder has a particle size ranging from about 2 to 5 microns.

In Example 1C, the composite powder comprising about 50% Pb and 50% asbestos has an absolute density of about 4.45 grams/cc., which is about 39.3% of the density of lead itself. A micrographic examination shows the composite powder product to be flat-like and of two-dimensional configuration. This type of powder is also excellent as a paint pigment because of its flaky characteristics and because of its substantially low density as compared to pure lead powder.

I am thus able to use the high specific surface characteristic of such non-metals as talc, asbestos, mica and diatomaceous silica, whose densities are low (e.g. 2.0 to about 3.5 grams/cc.), to produce a low density composite powder having all the attributes of metal powders for such uses as catalysts, fast drying agents and paint pigments. For example, I find that I can produce a composite product containing 50% tungsten deposited on 50% talc, of absolute density about 4.8 grams/cc. as compared to the density of about 19.3 grams/cc. for pure tungsten. Such a powder would have utility in reactions requiring a tungsten catalyst of low density. Similarly, a low density platinum composite powder could be provided.

In working in the density ranges stated for the composite powder, the specific surface may be at least about 300 cm.$^2$/gram. Preferably the specific surface will range from about 1500 to 110,000 cm.$^2$/gram and, particularly from about 3000 to 75,000 cm.$^2$/gram.

In the examples of group 2, I provide a process for producing a metal powder having a uniformly dispersed hard phase. Instead of adding a hard phase directly to the mix as in the examples of group 1, a soluble metal salt is introduced and it decomposes during the heating cycle to yield a finely dispersed refractory oxide. The metal component of the soluble salt is one having an oxide negative free energy of formation of at least about 90,000 calories per gram atom of oxygen at 25° C. Reducible soluble metal salts may also be added to the mix, that is metal salts which reduce under the same conditions as the metal oxide to a metal melting above 250° C. The ingredients may be proportioned to yield a metal powder product having dispersed therethrough from about one up to about 25% by volume (and preferably from about 2 to 15% by volume) of a refractory oxide, for example, thoria, alumina, ceria, baria, calcia, strontia, zirconia, titania and generally those refractory oxide materials having melting points above 1250° C.

In the examples of group 3, a process is provided for producing metal alloy systems, particularly homogeneous metal systems containing normally immiscible metals. Two or more reducible metal oxides may be employed, or one or more may be combined with metal salts reducible under the conditions of the reaction. As in groups 1 and 2, the metal component includes those metals which have melting points of over about 250° C. and which are characterized by an oxide negative free energy of formation per gram atom of oxygen of up to about 70,000 calories at 250° C. One or more metal powders may also be included in the initial formulation.

In producing a wet mix for the examples in groups 1, 2 or 3, the amount of polyhydroxy organic substance used should preferably not exceed about 15% by weight of the final dry residue produced, and levels of at least about 0.1% are preferred although beneficial effects may be obtained at even lower levels. Likewise, the amount of soluble metal salt should preferably not exceed about 10% by weight of the final dry residue produced. The amount of solvent should be adequate to give a workable viscosity while at the same time keeping drying time to a minimum.

EXAMPLE 4

A formulation is prepared in accordance with the invention, containing 56.9 grams $Cu_2O$ and 72.7 grams $Fe_2O_3$ (chosen to yield a 50:50 copper-iron composition) together with 0.8 gram sucrose in aqueous solution. After processing in accordance with the previous examples, including reduction in dry hydrogen at 875° C. for 30 minutes, the reduced metal product is ground at 1900 r.p.m. in a 5-inch diameter hammer mill equipped with a herringbone screen having 0.010 inch slots. As a measure of friability or ease of achieving a suitable powder for fabrication, the milled copper-iron powder is screened and found to contain 48.1 wt. percent material finer than 325 mesh.

The experiment is repeated with the omission of the sucrose. This time the milled product is found to contain only 15.2% of powder finer than 325 mesh, demonstrating the criticality of the polyhydroxy organic compound in the process.

A number of repeat experiments are now conducted, wherein the sucrose is replaced by a series of other polyhydroxy organic compounds in equal quantity, with results as follows:

*Effect of various organic compounds in reduction of $Cu_2O/Fe_2O_3$ mixture*

| Organic compound: | Friability (percent —325 mesh) |
|---|---|
| Carbowax 4000 | 58.2 |
| Dextran | 31.9 |
| Dextrin | 27.2 |
| Fructose | 25.4 |
| Glucose | 23.9 |
| 1, 2, 6-hexanetriol | 61.1 |
| Jaguar gum | 35.2 |
| Locust bean gum | 32.9 |
| Methocel 15 methyl cellulose | 65.3 |
| Sorbitol | 70.1 |

In addition, the effect of the polyhydroxy compound on reduction rate at 875° C. in this $Cu_2O:Fe_2O_3$ system is measured, in terms of the weight loss observed in converting the oxide mixture to metals:

| Reduction Time, Minutes | Weight Loss, Percent of Theory | |
|---|---|---|
| | 1% Sucrose | No Sucrose |
| 5 | 60.9 | (¹) |
| 15 | 88.8 | 70.3 |
| 25 | 94.1 | 89.2 |

¹ Product pyrophoric.

The physical properties afforded by the reduced copper-iron products of the new process are compared with those obtained employing a mixture of copper and iron powders. Test specimens of each are compacted at 50 tons per square inch without lubricant and sintered for 30 minutes at 1800° F. in dry hydrogen, with results as follows:

| Compact Properties | $Cu_2O/Fe_2O_3/$ sucrose Reduction Product | Mixed Cu-Fe Powders |
|---|---|---|
| Green strength, p.s.i. | 7,490 | 6,920 |
| Green density, g./cc. | 7.15 | 7.43 |
| Sintered density, g./cc. | 7.65 | 7.21 |
| Change in length, percent | -2.24 | +0.99 |
| Tensile strength, p.s.i. | 48,700 | 26,600 |
| Elongation, percent | 5.0 | 4.5 |
| Rockwell hardness | B-73 | H-84 |

Although the present invention has been described in conjunction with preferred embodiments, it is to be understood that modifications and variations may be resorted to without departing from its spirit and scope, as those skilled in the art will readily understand. Such modifications and variations are considered to be within the scope of the invention and the appended claims.

EXAMPLE 5

The effect of sucrose level on product friability is determined in the preparation of the allow known as Moly-Permalloy (77.5% nickel, 18.5% iron, 4% molybdenum) by reduction of oxides in accordance with the procedure of the previous examples, with results as follows:

| Sucrose (percent of total oxides): | Friability¹ (percent —325 mesh) |
|---|---|
| 0 | 16 |
| 0.8 | 27.8 |
| 3.6 | 27.1 |
| 6.3 | 30.1 |
| 8.9 | 39.4 |
| 11.3 | 41.7 |
| 13.6 | 54.2 |

¹ Product ground as in Example 4.

That the new process does not leave an appreciable carbon residue in the metal is shown by the following typical analyses:

| Alloy | Percent Sucrose Used | Carbon Content, p.p.m |
|---|---|---|
| Cr/Fe (50–50) | 1 | 83 |
| Cu/Fe (50–50) | 3 | 311 |
| Moly-Permalloy | 3 | 40 |

What is claimed is:
1. A process for producing a homogeneous metal-containing product which comprises the steps of:
   intimately mixing a paste comprising a polyhydroxy organic compound, a liquid vehicle for said compound, and at least two particulate metalliferous substances at least one of which is a reducible compound of oxygen and a metal melting above 250° C.;
   drying said paste to a homogeneous residue;
   heating said residue in a reducing atmosphere at a temperature sufficient to decompose said organic compound;
   and continuing said heating until at least one said reducible compound is reduced to elemental metal.
2. The process of claim 1 wherein said vehicle is water.
3. The process of claim 1 wherein said organic compound is sorbitol.
4. The process of claim 1 wherein said organic compound is a carbohydrate.
5. The process of claim 4 wherein said carbohydrate is sucrose.
6. The process of claim 1 wherein the concentration of said organic compound ranges up to about 15% by weight of the final dry residue produced from said paste.
7. The process of claim 1 wherein said reducible compound of oxygen and a metal is one wherein the metal component is characterized by an oxide negative free energy of formation of up to about 70,000 calories per gram atom of oxygen at 25° C.
8. The process of claim 7 wherein at least one other metalliferous substance is a compound of a metal characterized by an oxide negative free energy of formation of at least about 90,000 calories per gram atom of oxygen at 25° C.
9. The process of claim 8 wherein said other metalliferous substance forms under the conditions of said process a refractory oxide melting above about 1250° C.
10. The process of claim 8 wherein said other metalliferous substance melts above about 500° C. and is substantially inert under the conditions of said process.
11. The process of claim 10 wherein said inert substance is a refractory oxide melting above 1250° C.
12. The process of claim 1 wherein at least one of said metalliferous substances is an elemental metal.
13. The process of claim 1 wherein said metalliferous substances include at least two reducible metal oxides.
14. A process for producing a homogeneous metal-containing product having a hard phase uniformly dispersed therethrough which comprises the steps of:
   intimately mixing a paste comprising an aqueous dispersion of a polyhydroxy organic compound, at least one particulate reducible compound of oxygen and a metal characterized by a melting point above 250° C. and an oxide negative free energy of formation of up to about 70,000 calories per gram atom of oxygen at 25° C., and at least one soluble metal salt which decomposes under the conditions of said process to a refractory oxide characterized by a negative free energy of formation of at least about 90,000 calories per gram atom of oxygen at 25° C.;
   drying said paste to a homogeneous residue;
   heating said residue in a reducing atmosphere at a temperature sufficient to decompose said organic compound;
   and continuing said heating until at least one said reducible compound is reduced to elemental metal.

15. The process of claim 14 wherein the relative amounts of said metalliferous substances are selected to produce a final product comprising from about 75 to 99 volume percent metal and the balance up to about 25 volume percent of a disperse hard phase.

16. A process for producing a homogeneous product consisting of at least two metals which comprises the steps of:
- intimately mixing a paste comprising an aqueous dispersion of a polyhydroxy organic compound with at least two particulate reducible compounds of oxygen and metals, said metals each characterized by a melting point above 250° C. and an oxide negative free energy of formation of up to about 70,000 calories per gram atom of oxygen at 25° C.;
- drying said paste to a homogeneous residue;
- heating said residue in a reducing atmosphere at a temperature sufficient to decompose said organic compound;
- and continuing said heating until said reducible compounds are reduced to elemental metals.

17. The process of claim 16 wherein said metal components normally form an immiscible mixture.

18. The process of claim 16 wherein a metal powder is included as an ingredient of said paste.

References Cited by the Examiner
UNITED STATES PATENTS

| | | | |
|---|---|---|---|
| 2,877,126 | 3/1959 | Whitby | 106—290 |
| 3,031,316 | 4/1962 | Cavanaugh | 106—290 |
| 3,201,223 | 8/1965 | Chura et al. | 75—0.5 |
| 3,203,781 | 8/1965 | Bungardt | 75—0.5 |

DAVID L. RECK, *Primary Examiner.*

N. F. MARKVA, *Assistant Examiner.*